United States Patent
Yoakum et al.

(10) Patent No.: US 8,139,738 B1
(45) Date of Patent: Mar. 20, 2012

(54) TELEPHONE TO COMPUTATIONAL DEVICE ASSOCIATION

(75) Inventors: John H. Yoakum, Cary, NC (US); Philip Edholm, Pleasanton, CA (US)

(73) Assignee: Rockstar Bidco, LP, New York, NY (US)

( * ) Notice: Subject to any disclaimer, the term of this patent is extended or adjusted under 35 U.S.C. 154(b) by 2259 days.

(21) Appl. No.: 10/866,622

(22) Filed: Jun. 12, 2004

(51) Int. Cl.
*H04M 1/56* (2006.01)

(52) U.S. Cl. ............... 379/142.05; 379/88.17; 379/903; 379/167.13

(58) Field of Classification Search ............... 370/352, 370/353; 379/88.17, 142.05, 903, 167.13; 378/37
See application file for complete search history.

(56) References Cited

U.S. PATENT DOCUMENTS

| | | | | |
|---|---|---|---|---|
| 5,452,347 A * | 9/1995 | Iglehart et al. | ................ | 379/199 |
| 6,072,865 A * | 6/2000 | Haber et al. | ............. | 379/211.02 |
| 6,393,017 B1 * | 5/2002 | Galvin et al. | ................ | 370/352 |
| 6,594,357 B1 * | 7/2003 | Emerson et al. | ......... | 379/265.04 |
| 7,042,989 B2 * | 5/2006 | Lawson et al. | ............. | 379/88.17 |
| 7,043,230 B1 * | 5/2006 | Geddes et al. | ................ | 455/410 |
| 7,200,218 B1 * | 4/2007 | Lindley et al. | ........... | 379/221.11 |
| 7,257,217 B1 * | 8/2007 | Lee | ......................... | 379/265.01 |
| 2002/0101860 A1 * | 8/2002 | Thornton et al. | ............. | 370/352 |
| 2003/0235281 A1 * | 12/2003 | Williams et al. | ............... | 379/196 |
| 2004/0066926 A1 * | 4/2004 | Brockbank et al. | ...... | 379/207.13 |
| 2005/0047395 A1 * | 3/2005 | Narin et al. | .................... | 370/352 |

* cited by examiner

*Primary Examiner* — Fan Tsang
*Assistant Examiner* — Simon King
(74) *Attorney, Agent, or Firm* — Withrow & Terranova, PLLC

(57) ABSTRACT

The present invention allows for dynamic association of a computational device, such as a personal computer or personal digital assistant, with a telephone terminal. A computer-telephone adaptor or like function implemented in a telephony switch or other telephony device will receive authentication indicia. The authentication indicia may be provided by the computational device that is to be associated with the telephone terminal, or through other means. The authentication indicia may be provided by a user or generated by the computational device or by other means. To confirm the association, the user must enter confirmatory authentication indicia corresponding to the original authentication indicia through the telephone terminal.

38 Claims, 6 Drawing Sheets

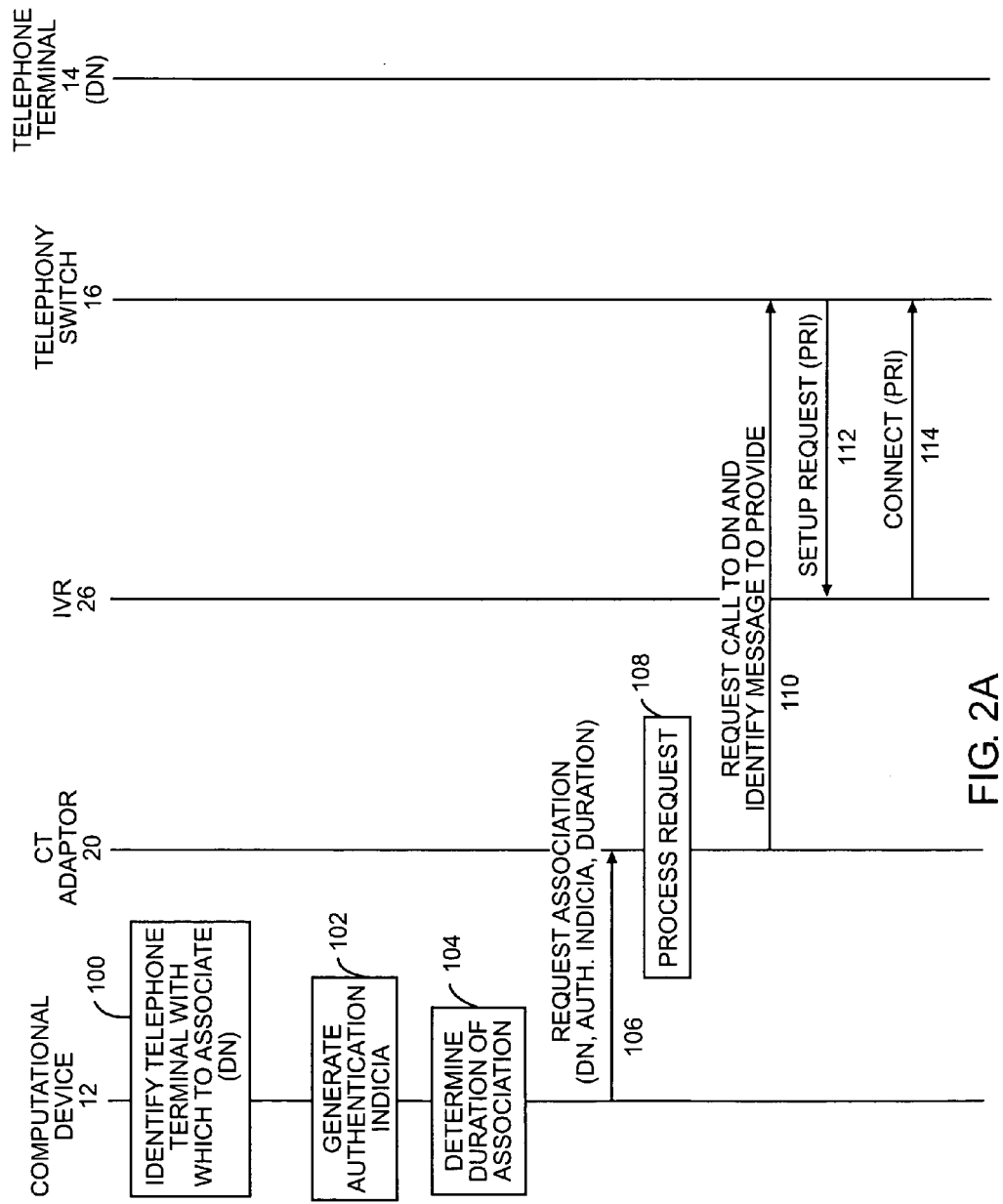

TELEPHONE TO COMPUTATIONAL DEVICE ASSOCIATION

FIELD OF THE INVENTION

The present invention relates to telecommunications, and in particular to associating a computational device with a telephone.

BACKGROUND OF THE INVENTION

As communications and computing technologies evolve, a greater need exists to associate telephony and computational devices. Such an association allows the computing device to control certain aspects and functions of the associated telephony device, as well as allowing the computational device to keep track of operational aspects of the telephony device. Although the association can be very beneficial, there is generally significant provisioning necessary to establish the association.

Given the increasing mobility of computational devices, such as personal computers and personal digital assistants, there are many instances where different computational devices may be associated with a given telephony device at any given time. In addition to the difficulty in provisioning such an association, there are significant security issues surrounding the association. Since these associations often allow access to incoming calls and the ability to initiate calls, which may result in billing charges or security issues, it is often inappropriate to allow uncontrolled associations between computational and telephony devices. Accordingly, there is a need for an effective and efficient technique for associating computational devices and telephony devices in an authorized and secure fashion.

SUMMARY OF THE INVENTION

The present invention allows for dynamic association of a computational device, such as a personal computer or personal digital assistant, with a telephone terminal. A computer-telephone adaptor or like function implemented in a telephony switch or other telephony device will receive authentication indicia. The authentication indicia may be provided by the computational device that is to be associated with the telephone terminal, or through other means. The authentication indicia may be provided by a user or generated by the computational device or by other means. To confirm the association, the user must enter confirmatory authentication indicia corresponding to the original authentication indicia through the telephone terminal.

In one embodiment, a request for an association is received by the computer-telephone adaptor or function, which will then effect the establishment of a call to the telephone terminal, wherein the user can provide the confirmatory authentication indicia. The request may also include the address of the telephone terminal, wherein the address may take the form of a directory number associated with the telephone terminal. The request may also identify the duration for which the association is maintained. Once the association is established, events or occurrences associated with the telephone terminal may be provided to the computer-telephone adaptor or function, which will provide a corresponding alert to the computational device. The computational device can then display information, such as identifying an incoming call as being received at the telephone terminal and any associated caller identification. Further, the computer-telephone adaptor or function may receive instructions from the computational device and take the necessary steps to control operations of the telephone terminal or entities associated therewith based on the instructions.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

FIGS. 2A and 2B illustrate an exemplary communication flow according to a first embodiment of the present invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Figure 1:
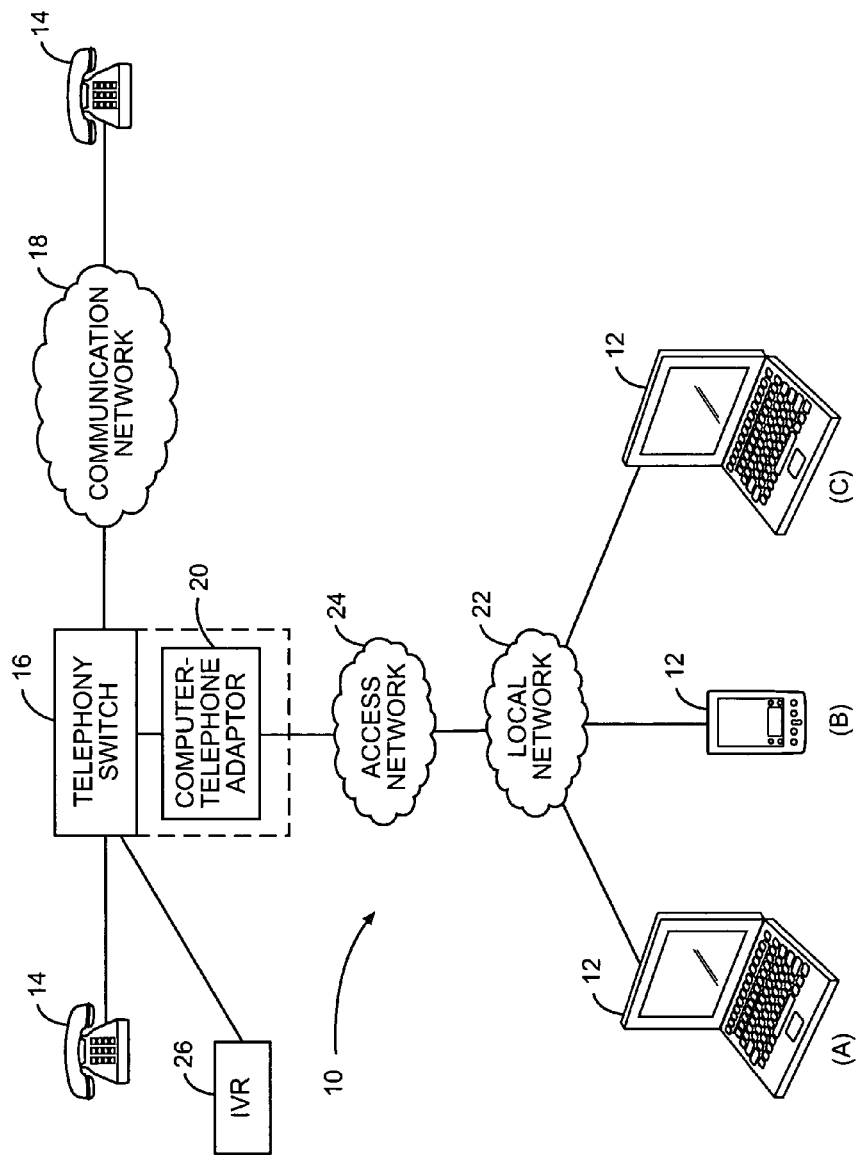
FIG. 1 is a block representation of a communication environment according to one embodiment of the present invention.

With reference to FIG. 1, a communication environment 10 is illustrated according to one embodiment of the present invention. As illustrated, one or more computational devices 12, such as a personal computer 12(A, C) or personal digital assistant 12(B), may be associated with a telephone terminal 14. The telephone terminals 14 may be directly connected to a telephony switch 16 via a telephony line, or may be indirectly coupled to the telephony switch 16 through a communication network 18. Notably, the telephony switch 16 may be based on circuit-switched or packet-based communication technologies. The communication network 18 may include both circuit-switched and packet-based networks, such as the Public Switched Telephone Network (PSTN) and the Internet, respectively.

To control the association between the computational devices 12 and the telephone terminals 14, a computer-telephone adaptor 20 is provided in association with the telephony switch 16, and may be implemented as a function within the telephony switch 16 or may be a separate peripheral that is capable of communicating with the telephony switch 16 to effect an association with one or more of the telephone terminals 14. The computer-telephone adaptor 20 is coupled to the computational devices 12 directly or indirectly through a local network 22, such as a local area network (LAN) or wireless local area network (WLAN), and an access network 24, such as a T1, digital subscriber line (DSL), cable connection, or the like. Additionally, an interactive voice response (IVR) system 26 may be associated with the telephony switch 16 and may be capable of establishing a call or similar voice session with one of the telephone terminals 14 to provide information to the user of the telephone terminal 14 as well as receive information provided by the user. The information provided by the user may be dual tone multi-frequency (DTMF) signals resulting from the user pressing buttons on the keypad associated with the telephone terminal 14, or may be speech, wherein the IVR system 26 will be able to recognize the speech of the user and process it as appropriate. Those skilled in the art will recognize that the IVR functionality can be implemented in the telephone switch 16, the computer-telephone adaptor 20, or in a separate peripheral as illustrated.

In operation, the computer-telephone adaptor 20, whether implemented as a function of the telephony switch 16 or as a separate entity, will facilitate the association between a computational device 12 and a telephone terminal 14 in a dynamic fashion. Once the association is established, the computer-telephone adaptor 20 may alert the computational device 12 of actions taking place at the associated telephone terminal 14, or may control the telephone terminal 14 based on instructions received from the associated computational device 12, such as initiating a call from the telephone terminal 14.

In general, associating a computational device 12 with a telephone terminal 14 occurs as follows. First, a user will select a telephone terminal 14 with which a computational device 12 is to be associated, and establish authentication indicia. The identification of the telephone terminal 14 and the authentication indicia is provided to the computer-telephone adaptor 20, either through the computational device 12 or by other appropriate means. Subsequently, the user will go to the selected telephony terminal 14 and enter the authentication indicia through the keypad of the telephone terminal 14 or by speaking the authentication indicia. The authentication indicia is provided directly or indirectly to the computer-telephone adaptor 20 and compared with the authentication indicia provided through the computing device 12 or other means. If the authentication indicia provided through the computational device 12 or other means and the telephone terminal 14 match, an association between the computational device 12 and the telephone terminal 14 is established. Once the association is established, the telephone terminal 14 may be controlled by the computer-telephone adaptor 20 in response to instructions received from the computational device 12. Further, information pertaining to operational aspects of the telephone terminal 14 may be provided to the computer-telephone adaptor 20, which will forward or otherwise alert the computational device 12 of the events occurring at the telephone terminal 14. For example, upon receiving an incoming call, the computer-telephone adaptor 20 will receive information indicating an incoming call is being received, and provide an alert to the computational device 12. The computational device 12 will then generate a screen pop, or informational window, providing a message to the user indicating an incoming call is being received at the telephone terminal 14 and may provide caller identification information corresponding to the incoming call.

Figure 3:
FIG. 3 is an exemplary communication flow according to a second embodiment of the present invention.
Figure 4:
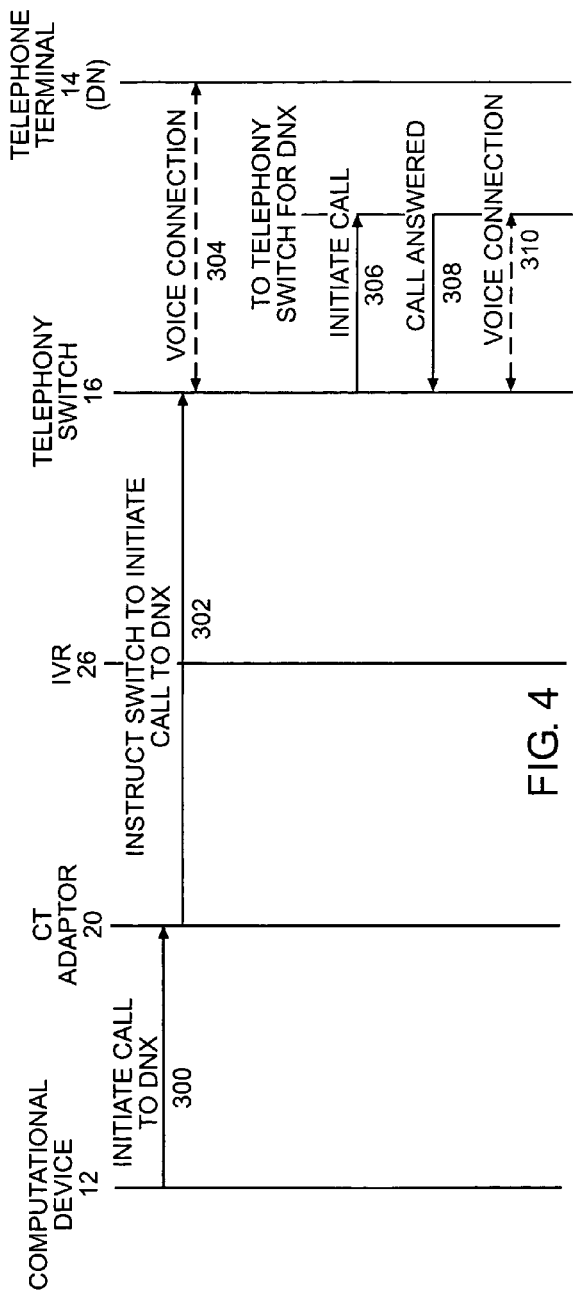
FIG. 4 is an exemplary communication flow according to a third embodiment of the present invention.

Those skilled in the art will recognize various techniques for retrieving the authentication indicia from the user via the telephone terminal 14 and for providing the authentication indicia to the computer-telephone adaptor 20. The communication flow diagrams of FIGS. 2, 3, and 4 illustrate an exemplary authentication scenario, a screen pop scenario in response to an incoming call, and initiating a call from the telephone terminal 14 in response to instructions from the computational device 12, respectively.

Figure 2B:
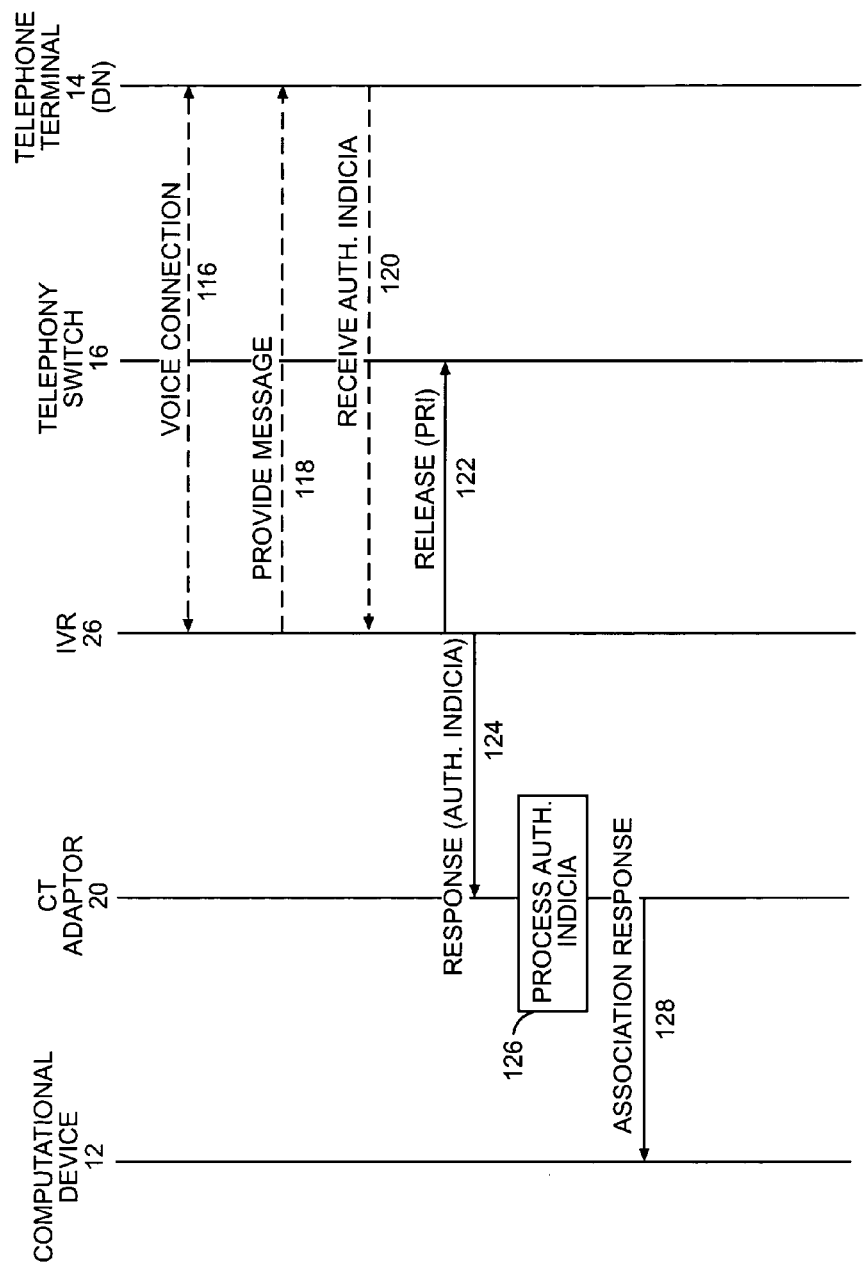

Turning now to FIGS. 2A and 2B, assume that the computational device 12 identifies a telephone terminal 14 with which to associate when a user enters an address associated with the telephone terminal 14 at the computational device 12 (step 100). In this example, the address is a directory number (DN) associated with a telephony line coupled to the telephony switch 16. Next, the computational device 12 will generate authentication indicia, which may be internally generated and provided to the user of the computational device 12, or may be received directly from the user (step 102). Optionally, the computational device 12 may determine the duration of the association, based on user input or other predefined criteria (step 104). At this point, the computational device 12 will send a request for the association to the computer-telephone (CT) adaptor 20 (step 106). The request may include the directory number (DN) for the telephony terminal 14, the authentication indicia, as well as the duration of the association, if applicable. The computer-telephone adaptor 20 will process the request (step 108) and automatically initiate a voice session, such as a traditional voice call, to the telephone terminal 14 to retrieve the confirmatory authentication from the user via the telephone terminal 14. In this example, the IVR system 26 is used to retrieve the confirmatory authentication indicia from the user via the telephone terminal 14. As such, a Request is sent to the telephony switch 16 to establish a call to the directory number (DN) associated with the telephone terminal 14 and may identify a message to provide to the user once the call is established (step 110). The message may be one of any number of automated messages, which are stored in the IVR system 26 and capable of being audibly announced to the user once the call is established with the telephone terminal 14.

When the telephony switch 16 receives the Request from the computer-telephone adaptor 20, the telephony switch 16 will send a Setup Request to the IVR system 26 (step 112). The setup request will include the directory number of the telephone terminal 14 and identification information identifying the message to provide to the user. In the illustrated embodiment, a Primary Rate Interface (PRI) is provided between the telephony switch 16 and the IVR system 26. As such, the IVR system 26 will send a Connect message back to the telephony switch 16 (step 114), wherein a voice connection is established between the IVR system 26 and the telephone terminal 14 via the telephony switch 16 (step 116). Once the voice connection is established, the IVR system 26 will provide the selected message in an audible format to the user via the telephone terminal 14 (step 118). For example, the message may state, "Please enter your authentication indicia to confirm an association with computing device XXX by entering the authentication indicia on your telephone keypad or by clearly speaking the authentication indicia. Please press the pound sign once you are finished entering your authentication indicia." In response to the message, the user will enter the authentication indicia on the telephone keypad or speak the authentication indicia. The IVR system 26 will receive the authentication indicia (step 120), and send a Release message to the telephony switch 16 to release the voice connection to the telephone terminal 14 (step 122), as well as send a Response to the computer-telephone adaptor 20 including the authentication indicia received by the user via the telephone terminal 14 (step 124).

The computer-telephone adaptor 20 will process the authentication indicia (step 126) and determine whether or not the association should be established. In essence, the authentication indicia received from the computational device 12 (or via other means) and that received from the user through the telephone terminal 14 are compared. If the comparison is positive, the association is approved, otherwise the association is not approved. Once a determination is made as to whether to associate the computational device 12 with the telephone terminal 14, an Association Response is sent to the computational device 12 to indicate whether the association has been established (step 128). At this point, assuming the authentication indicia received from the computational device 12 and the telephone terminal 14 match, an association is established.

With reference to FIG. 3, assume an incoming call intended for directory number DN, which is associated with telephone terminal 14, is received at the telephony switch 16 (step 200). The telephony switch 16 is provisioned to provide an alert to the computer-telephone adaptor 20 to indicate that an incoming call is being received at the telephone terminal 14 (step 202). The alert may include the directory number associated with the telephone terminal 14, as well as any caller identification information (caller ID) associated with the caller initiating the incoming call. The computer-telephone adaptor 20 may then initiate a screen pop by sending an appropriate message to the computational device 12 (step 204). The message may include the directory number, as well as the caller identification. The computational device 12 will then process the message and provide the information to the user in the form of a screen pop, which may be a window provided to the user overtop of all running applications, indicating that there is an incoming call intended for the telephone terminal 14, as well as providing the caller identification (step 206). The computational device 12 can instruct the telephone terminal 14 to answer the call, reject the call, transfer the call, terminate the call in voice mail, reroute the call to a computational device soft client, or other options.

Once the association is established, the computational device 12 may be used to control the telephone terminal 14. With reference to FIG. 4, an exemplary scenario is shown wherein the computational device 12 is used to initiate a call to directory number DNX from telephone terminal 14. Initially, the computational device 12 will determine that there is a need to initiate a call to directory number DNX, and send a message to the computer-telephone adaptor 20 to initiate a call to directory number DNX from the telephone terminal 14 (step 300). The computer-telephone adaptor 20 will then instruct the telephony switch 16 to initiate a call to directory number DNX (step 302). The telephony switch 16 will establish a voice connection with the telephone terminal 14 (step 304), as well as initiate a call to a telephony switch (not shown) supporting directory number DNX (step 306). The message to initiate the call may take the form of an Integrated Services User Part (ISUP) Initial Address Message (IAM). When the call is answered (step 308), a voice connection is established between the called party device associated with directory number DNX and the telephone switch 16 (step 310). The respective voice connections are connected and a call is established between the telephone terminal 14 and the called party's device. Alternatively, the computer-telephone adaptor 20 may initiate a call to directory number DNX from the telephone terminal 14 such that the telephony switch 16 will initiate ringing of the telephone terminal 14 prior to or in parallel with establishing a connection to the telephone terminal associated with directory number DNX. The telephony switch 16 will establish a voice connection between the telephone terminal associated with directory number DNX and the telephone terminal 14 when the respective terminals are answered. The latter embodiment is particularly beneficial when the computer-telephone adaptor 20 cannot control whether the telephone terminal 14 is on or off hook.

Figure 5:
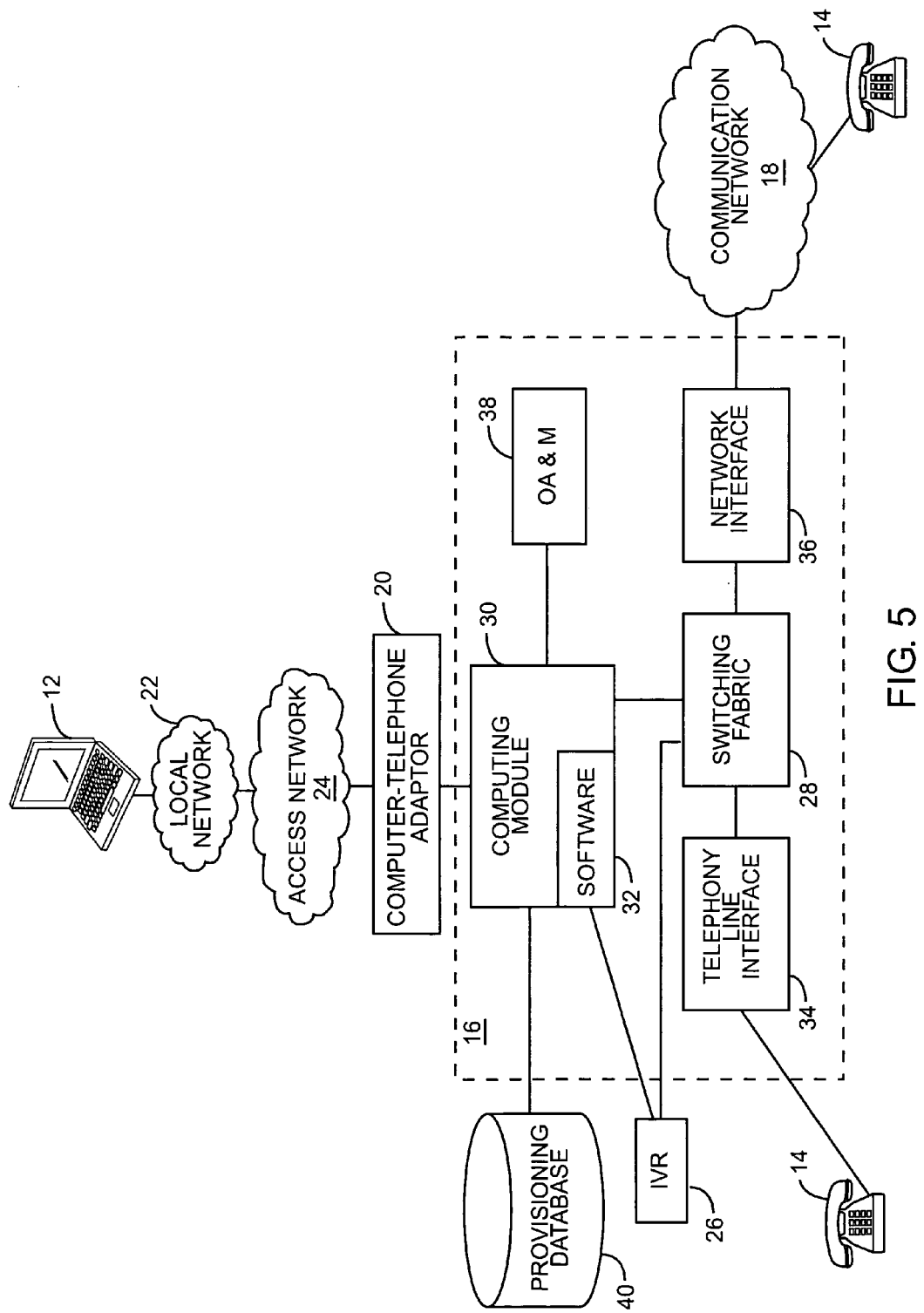
FIG. 5 is a block representation of a telephony switch according to one embodiment of the present invention.

Turning now to FIG. 5, a block representation of a telephony switch 16 is illustrated. These telephony switches may be implemented in a variety of ways using different equipment types, such as Nortel Networks Limited's DMS-100 local switching system or private branch exchange switch. The telephony switch 16 typically includes a switching fabric module 28, a computing module 30 including storage for software 32, a telephone line interface 34, a network interface 36, an operations/administration and maintenance (OA & M) module 38 and an interface to the computer telephone adaptor 20. The switching fabric 28 may comprise logical and physical switches for interconnecting the telephone line interface 34 with the communication network 18 through the network interface 36. As illustrated, the computing module 30 controls circuit-switched communications via the switching fabric 28 and is capable of providing traditional intelligent network monitoring and functions as well as the computer-telephone adaptor functionality in select embodiments. Further, the computing module 30 may cooperate with a provisioning database 40, which provides information allowing the telephony switch 16 to properly identify, locate, and provision the various telephone terminals 14 supported by the telephony switch 16. Notably, the IVR 26 may be embedded in the telephone switch 16.

Figure 6:
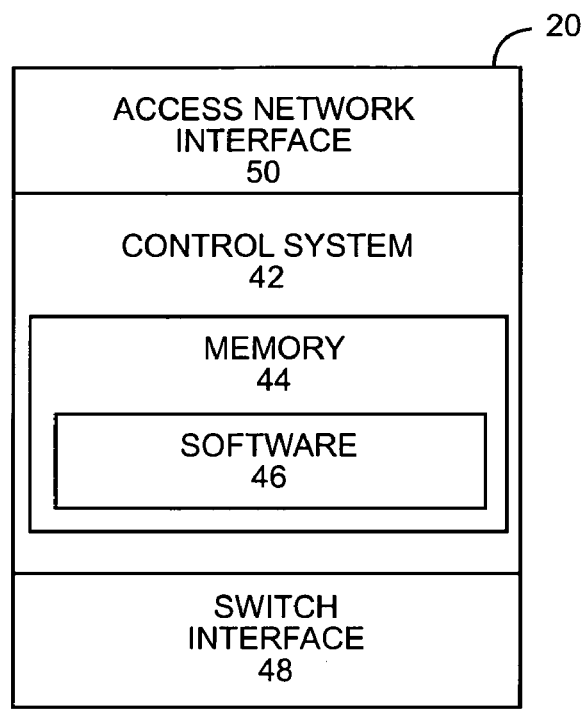
FIG. 6 is a block representation of a computer-telephone adaptor according to one embodiment of the present invention.

With reference to FIG. 6, a computer-telephone adaptor 20 is illustrated as having a control system 42 with sufficient memory 44 to store the software 46 used to provide the functionality described above. The control system 42 may be associated with a telephony switch interface 48, as well as an access network interface 50. The access network interface 50 is used to communicate with the computational devices 12 directly or indirectly, and the switch interface 48 is used to communicate with the telephony switch 16, if necessary. As noted, the functionality of the computer-telephone adaptor 20 may be implemented in the telephony switch 16. Further, the IVR functionality may be embedded in the computer-telephone adaptor 20.

Those skilled in the art will recognize improvements and modifications to the preferred embodiments of the present invention. All such improvements and modifications are considered within the scope of the concepts disclosed herein and the claims that follow.

What is claimed is:

1. A method for associating computational devices with telephone terminals comprising:
   a) receiving authentication indicia from a computational device in a request to associate a telephone terminal with the computational device;
   b) receiving confirmatory authentication indicia originally provided via the telephone terminal; and
   c) processing the authentication indicia and the confirmatory authentication indicia to determine whether to associate the computational device with the telephone terminal.

2. The method of claim 1 further comprising establishing an association between the computational device and the telephone terminal.

3. The method of claim 1 further comprising receiving duration indicia identifying a duration for an association between the computational device and the telephone terminal.

4. The method of claim 3 further comprising terminating the association between the computational device and the telephone terminal when the duration expires.

5. The method of claim 1 wherein when the authentication indicia does not correspond to the confirmatory authentication indicia, an association between the computational device and the telephone terminal is not established.

6. The method of claim 1 wherein the confirmatory authentication indicia is provided by a user of the computational device.

7. The method of claim 1 wherein the authentication indicia is provided by a user of the computational device.

8. The method of claim 1 wherein the authentication indicia is generated by the computational device.

9. The method of claim 1 wherein an address of the telephone terminal is provided with the request.

10. The method of claim 9 wherein the address is a directory number.

11. The method of claim 1 further comprising effecting establishment of a call to the telephone terminal in which the confirmatory authentication indicia is obtained via the telephone terminal.

12. The method of claim 11 wherein the call is established and the confirmatory authentication indicia is obtained using an interactive voice response system.

13. The method of claim 1 further comprising:
a) receiving information pertaining to an occurrence associated with the telephone terminal; and
b) sending the information to the computational device wherein the computational device takes action based on the information.

14. The method of claim 13 wherein the information relates to a call being initiated to the telephony terminal.

15. The method of claim 13 wherein the information comprises caller identification information.

16. The method of claim 13 wherein the information is provided to a user via the computational device.

17. The method of claim 1 further comprising:
a) receiving instructions from the computational device to control an operation associated with the telephone terminal; and
b) effecting the operation associated with the telephone terminal.

18. The method of claim 17 wherein the operation is establishing a call to another device from the telephone terminal.

19. The method of claim 18 wherein the call is established by effecting ringing of the telephone terminal and a connection is established with the device when the telephone terminal is answered.

20. A system for associating computational devices with telephone terminals comprising:
a) at least one communication interface; and
b) a control system associated with the at least one communication interface and adapted to:
i) receive authentication indicia from a computational device in a request to associate a telephone terminal with the computational device;
ii) receive confirmatory authentication indicia originally provided via the telephone terminal; and
iii) process the authentication indicia and the confirmatory authentication indicia to determine whether to associate the computational device with the telephone terminal.

21. The system of claim 20 wherein the control system is further adapted to establish an association between the computational device and the telephone terminal.

22. The system of claim 20 wherein the control system is further adapted to receive duration indicia identifying a duration for an association between the computational device and the telephone terminal.

23. The system of claim 22 wherein the control system is further adapted to terminate the association between the computational device and the telephone terminal when the duration expires.

24. The system of claim 20 wherein when the authentication indicia does not correspond to the confirmatory authentication indicia, an association between the computational device and the telephone terminal is not established.

25. The system of claim 20 wherein the confirmatory authentication indicia is provided by a user of the computational device.

26. The system of claim 20 wherein the authentication indicia is provided by a user of the computational device.

27. The system of claim 20 wherein the authentication indicia is generated by the computational device.

28. The system of claim 20 wherein an address of the telephone terminal is provided with the request.

29. The system of claim 28 wherein the address is a directory number.

30. The system of claim 20 wherein the control system is further adapted to effect establishment of a call to the telephone terminal in which the confirmatory authentication indicia is obtained via the telephone terminal.

31. The system of claim 30 wherein the call is established and the confirmatory authentication indicia is obtained using an interactive voice response system.

32. The system of claim 20 wherein the control system is further adapted to:
a) receive information pertaining to an occurrence associated with the telephone terminal; and
b) send the information to the computational device wherein the computational device takes action based on the information.

33. The system of claim 32 wherein the information relates to a call being initiated to the telephony terminal.

34. The system of claim 32 wherein the information comprises caller identification information.

35. The system of claim 32 wherein the information is provided to a user via the computational device.

36. The system of claim 20 wherein the control system is further adapted to:
a) receive instructions from the computational device to control an operation associated with the telephone terminal; and
b) effect the operation associated with the telephone terminal.

37. The system of claim 36 wherein the operation is establishing a call to another device from the telephone terminal.

38. The system of claim 37 wherein the call is established by effecting ringing of the telephone terminal and a connection is established with the device when the telephone terminal is answered.

* * * * *